United States Patent [19]

Becker

[11] Patent Number: 5,100,177
[45] Date of Patent: Mar. 31, 1992

[54] TIRE SPRAY CONTROL DEVICE

[76] Inventor: John H. Becker, 8553 Pleasantwood Ave., North Canton, Ohio 44720

[21] Appl. No.: 452,192

[22] Filed: Dec. 18, 1989

Related U.S. Application Data

[60] Continuation-in-part of Ser. No. 228,379, Aug. 4, 1988, abandoned, which is a division of Ser. No. 76,699, Jul. 23, 1988, Pat. No. 4,858,941.

[51] Int. Cl.⁵ .............................................. B62B 9/16
[52] U.S. Cl. ............................................... 280/851
[58] Field of Search ........................................ 280/851

[56] References Cited

U.S. PATENT DOCUMENTS

| | | | |
|---|---|---|---|
| 3,784,226 | 1/1974 | Wilfert et al. | 280/851 |
| 4,192,522 | 3/1980 | Morgan | 280/851 |
| 4,334,694 | 6/1982 | Iwanicki | 280/851 |
| 4,436,319 | 3/1984 | Clutter | 280/851 |
| 4,585,242 | 4/1986 | Sparks | 280/851 |
| 4,706,981 | 11/1987 | Dorwart | 280/851 |

FOREIGN PATENT DOCUMENTS

| | | | |
|---|---|---|---|
| 2524344 | 12/1976 | Fed. Rep. of Germany | 280/851 |
| 1526212 | 9/1978 | United Kingdom | 280/851 |

*Primary Examiner*—Robert P. Olszewski
*Assistant Examiner*—Eric Culbreth
*Attorney, Agent, or Firm*—Samuels, Gauthier & Stevens

[57] ABSTRACT

A fender to control water spray and to cool tires and brakes which has a leading plate with blade-like openings. The fender further comprises a top plate, a side wall and a trailing plate. The top plate with the leading plate form an air scoop. The side walls are louvered. The air is directed to expand adiabatically to both control the spray cast from the rotating tire and to cool the tires and brakes whether or not there is spray present.

16 Claims, 3 Drawing Sheets

TIRE SPRAY CONTROL DEVICE

CROSS REFERENCE APPLICATIONS

This application is a continuation-in-part of U.S. Ser. No. 228,379 filed Aug. 4, 1988, which is a divisional application of U.S. Ser. No. 076,699 filed July 23, 1988, and now U.S. Pat. No. 4,858,941.

BACKGROUND AND BRIEF SUMMARY OF THE INVENTION

The nation's highways provide a means whereby millions of trucks/trailer transport and the like are freight carriers and move in a majority of cargo and commodities from one point to the other. My prior invention embodied in the above-referenced co-pending application and patent were directed to a fender installed around or over the wheels of these transports to prevent the generation and dispersement of finely divided water streams or snow mist cast from the rotating tires. Broadly, that invention included a leading plate having blade-like openings therein in combination with a back plate and/or a side plate, the side plate having openings therein; the openings of the front and side plates were adapted to direct the flow of water inwardly and downwardly with reference to the longitudinal axis of the travelling vehicle. In addition to overcoming the problem of throwing spray from the tires of the vehicle, which impaired the vision of passing or trailing motorists, the directed air streams aided in cooling the brakes of the vehicle and in reducing the drag acting on the vehicle created by the vacuum on the underside of the carriage.

The prior art is believed best exemplified by the references cited in my parent application and patent.

The present invention embodies aspects of my prior invention and includes further modifications, which significantly enhance the performance of the fender.

Broadly, this invention comprises a fender having a leading plate characterized by blade-like openings, which may be horizontal, vertical and/or both, an upper entrance air scoop, a top plate, a side wall having a plurality of louvers attached or formed therein to form compression chambers and a trailing plate, the trailing plate characterized by an exit air scoop. The front and rear air scoops, in addition to controlling and directing the flow of spray created by the tires, reduce the drag caused by the fender itself.

In an alternative embodiment where the housing is used for multi-axle vehicles, the top plate may be characterized by compression plates forming zones of adiabatically expanding compressed air to further cool the tires and brakes.

In still another alternative embodiment, the leading plate is modified to have blade-like openings alone or in combination with openings formed in the front fender and bumper(s) of the vehicle.

DESCRIPTION OF THE PREFERRED EMBODIMENT(S)

Figure 1:
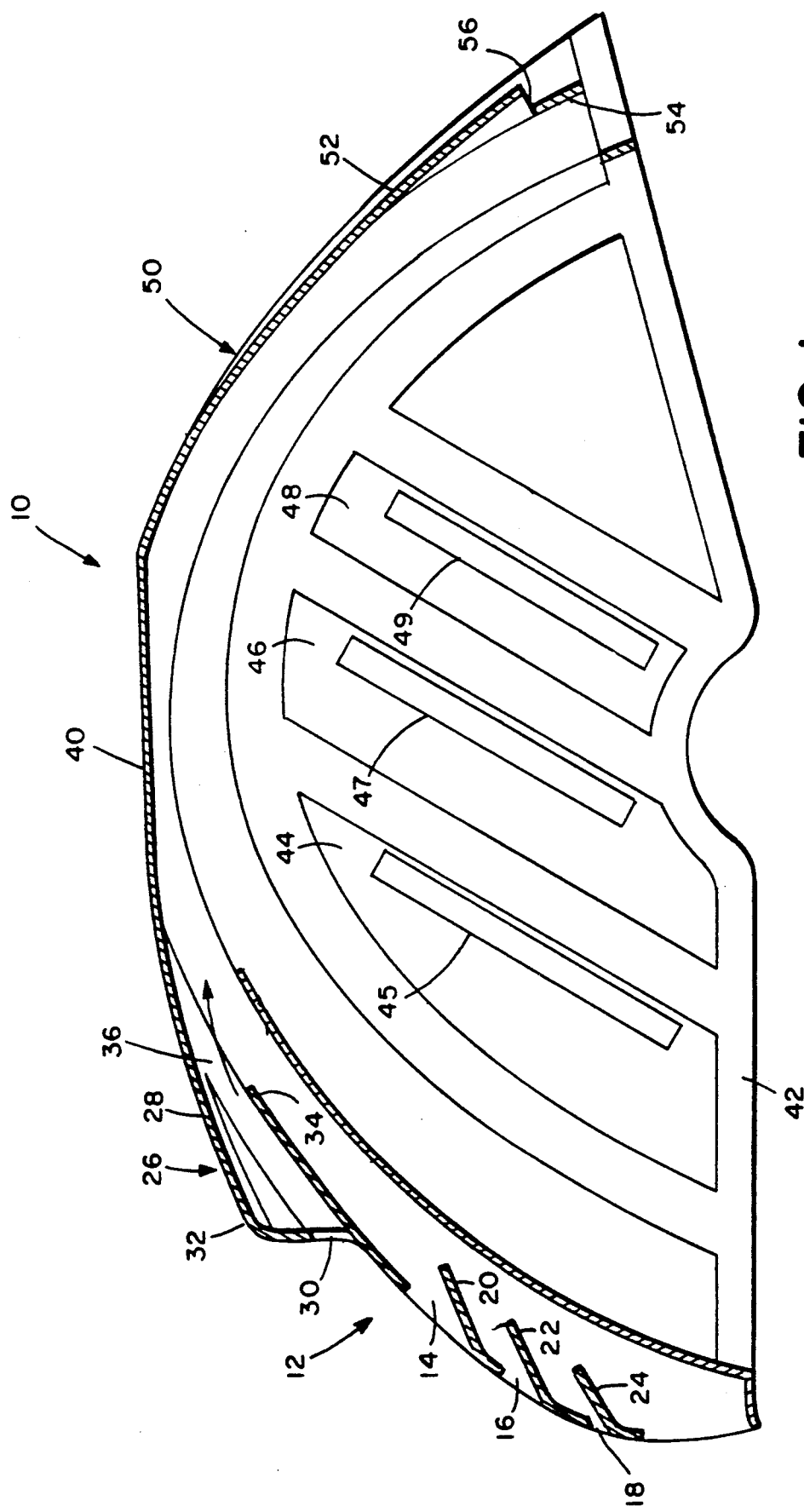
FIG. 1 is a side view of a fender housing embodying the invention.
Figure 2:
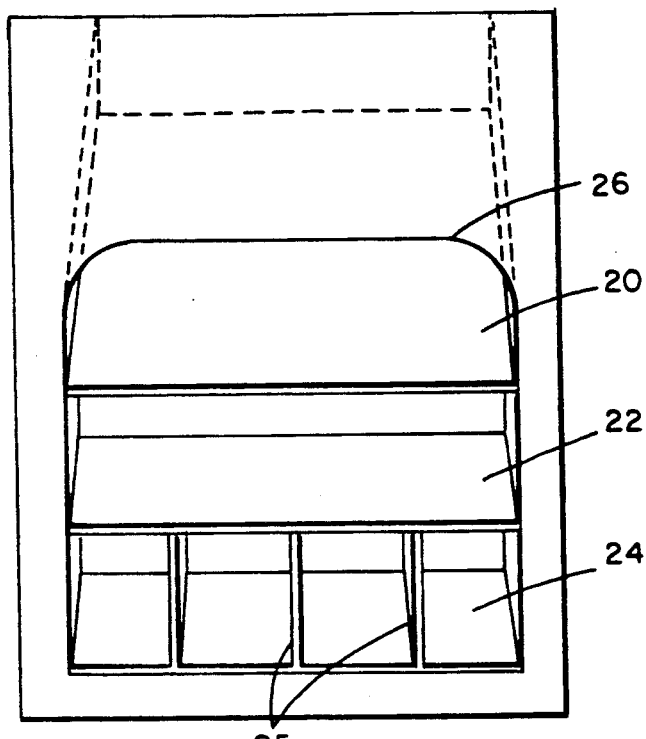
FIG. 2 is a front view of FIG. 1.

Referring to FIG. 1, a fender shown at 10 comprises a leading plate 12 having blade-like openings 14, 16 and 18 defined by blades 20, 22 and 24 respectively. FIG. 2 shows vertical blades 25. Formed in the upper portion of the plate 12 is a front air scoop 26 which comprises a top wall 28 and a front wall 30 joined to the front fender 12. The juncture of the top wall 28 and the front wall 30 define an opening 32 through which air flows. The leading plate 12 includes an inwardly extending plate 34 which functions in combination with the top wall 28 to form a diminishing cross-sectional flow path 36.

Joined to the leading plate is a top plate 40 and a side wall 42. The side wall includes louvers 44, 46 and 48 formed therein. The air flows through slit-like openings 45, 47 and 49 where the air is compressed and then discharged adiabatically onto the tire surfaces and into the brake-drum areas. The louvers function in combination with the blade-like openings in the front in a manner such as described in my prior application which is hereby incorporated by reference in this disclosure in its entirety.

Figure 3:
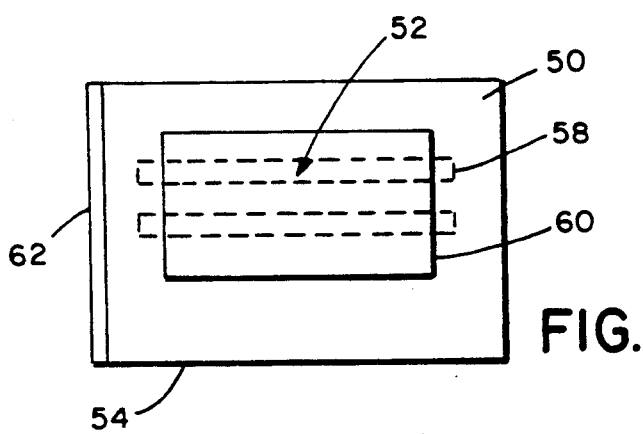
FIG. 3 is a rear view of FIG. 1.

Joined to the side wall 42 and the top plate 40 is a trailing plate shown generally at 50. The trailing plate 50 is characterized by a deflecting baffle 52, the depending end of which is spaced outwardly from a plate 50 and defines an opening 56 across the width of the back plate as shown in FIG. 3.

The fender is secured to a vehicle in any suitable manner. When secured, the leading plate is spaced apart from the leading edge of the tire, the top plate 40 covers the upper portion of the tire, the trailing plate 50 covers the trailing edge of the tire and the side 42 covers at least the upper third of the tire.

The inwardly extending plate 34 and the top wall 28 define the flow path 36 of diminishing dimension such that air flowing through the scoop is compressed. When the air is discharged, it adiabatically expands resulting in a cooling effect. The direction of discharge is such that the adiabatically expanded cooled air is directed onto and between the rotating tires to assist in cooling of the tires and the brakes of the tires. Further, the discharged air additionally controls the rooster tail or spray caused by the rotating tire and minimizes the drag affect caused by the housing per se.

Figure 4:
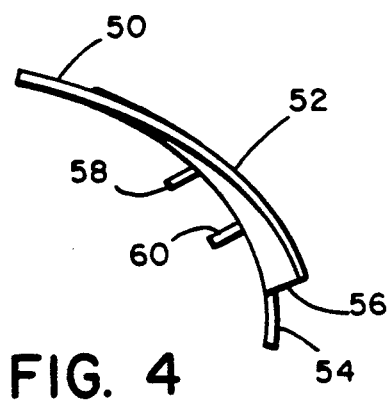
FIG. 4 is a side view of an exit air scoop.

The trailing plate 50 with the exit air scoop 52 has been found to be more advantageous than the use of the blades per se in combination with a trailing plate 50 as described in my prior invention. However, blades 58 and 60 are shown in FIGS. 3 and 4 and may be used optionally as desired. The baffle 52 and plate 50, in combination with the opening 56, are structured to deposit the cast spray downwardly on the ground and to prevent the spray collected by the back plate 52 from reentering the zone wherein the spray is created by the rotating tire. Previously, some of the spray controlled by the trailing plate was cast back on to the tire creating unnecessary turbulence and drag. The exit air scoop directs the controlled and collected spray downwardly and outside of the fender 54. Further, it is directed beyond the zone of turbulence created by the rotating tire.

Figure 5:
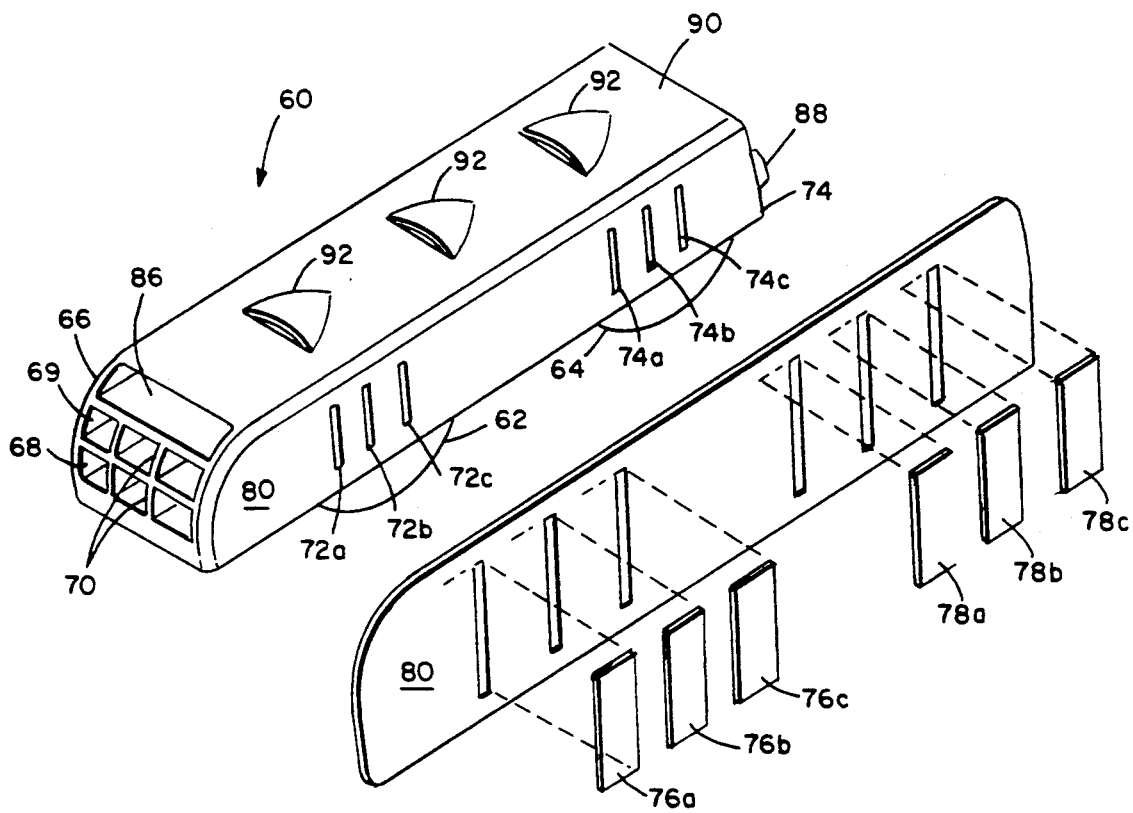
FIG. 5 is an alternative embodiment of the invention illustrating a fender for multi-axle vehicles.

Referring to FIG. 5, an extended fender of the invention is shown at 60 enclosing multi-axle tires 62 and 64. The fender includes a leading plate 66, a trailing plate 74 and a side 80. The leading plate 66 includes horizontal blade-like openings 68 as described for FIGS. 1 and 2 and vertical blades 70. The side plate 80 has narrow slit openings 72a, 72b and 72c and 74a, 74b and 74c. They are covered with louver plates 76a, 76b and 76c and 78a, 78b and 78c respectively are received over the openings. The louvers function as described for the preferred embodiment. The fender 60 has an entrance air scoop 86. The trailing plate 74 of the fender 60 includes a rear exit scoop 88. The blade-like openings 68, louvers 76a, 76b and 76c and 78a, entrance air scoop 86, rear exit scoop 88 and louvers 76 and 78 function substantially as described for the preferred embodiment. A top plate 90 is characterized by a plurality of compression plates shown generally at 92.

Figure 7:
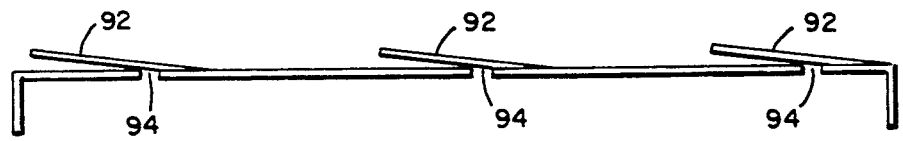
FIG. 7 is a side view of FIG. 6.
Figure 6:
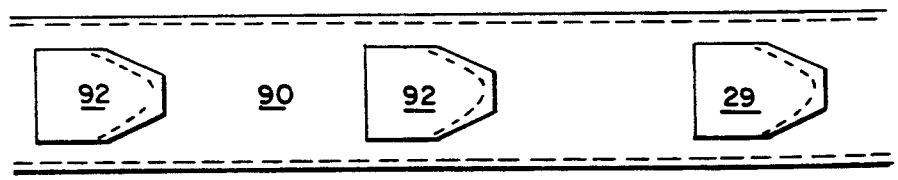
FIG. 6 is a top view of a top wall with compression plates.

Referring to FIG. 6, a top view of the top plate 90 shows compression plates 92. FIG. 7 is a side view of FIG. 6 and shows the compression plates 92 defining with the plate 90 flow passages 94. As with the entrance air scoop, the air is compressed on the upstream side of the flow passages 94 and then adiabatically expanded on the downstream side.

The various embodiments have been described with reference to the entrance air scoop, the exit air scoop, openings in the leading plate and louvered openings. The various openings do not necessarily have to be horizontal and/or vertical. They may be at various angles with reference to the horizontal and they do not necessarily have to be uniformly spaced apart from one another, be in parallel relationship with one another or be uniform in size. Depending upon the flow characteristics desired for the air passing therethrough, the size and orientation of the openings either singly or in combination can vary. Similarly, with the slit-like openings defined by the louvers to create the adiabatic expansion of the air, they do not have to be spaced apart equally or uniformly and they do not have to be in parallel relationship with one another. That is, they may be at various orientations. In fact, it can be desirable that the openings defined by the entrance air scoop, the louvers and compression plates be of different sizes to create desired flow patterns and degree of cooling of the adiabatically expanding air.

Having described my invention, what I now claim is:

1. A fender system to control the spray cast form a tire which comprises:
    a front plate spaced apart from the leading surface of the tire having blade-like openings therein to control the spray cast from the tire;
    a back plate spaced apart from the trailing surface of the tire;
    a side wall joined to the front and back plates and lying in a plane substantially perpendicular to the axis of rotation of the tire, the side wall covering at least one third of the tire, the side wall containing louvered openings;
    a top plate joined to the front and back plates;
    an air scoop formed in the upper portion of the front plate and the leading portion of the top plate, the scoop including a baffle spaced apart form and defining with the leading portion of the top late, a flow path of diminishing cross section from its inlet to its outlet, the flow passage causing the air flowing therethrough to discharge diabatically in a rearward direction to control the spray and to cool the tire and brake associated with the tire and the louvered openings directing the air toward the rotating tire to cool the tire and brake associated with the tire.

2. The fender of claim 1 wherein the inlet of the flow passage extends substantially across the width of the front plate and top plate.

3. The fender of claim 1 wherein the flow passage is substantially rectangular.

4. The fender of claim 1 wherein the baffle is an extension of the front plate which extends under the top cover.

5. The fender of claim 4 wherein the leading portion of the top plate includes depending edges engaged to the front plate to define a slot-like opening for the air scoop.

6. The fender of claim 1 wherein the blade-like openings are substantially horizontal.

7. The fender of claim 6 wherein the blade-like openings are substantially parallel to one another.

8. The fender of claim 1 wherein the blade-like openings are substantially vertical.

9. The fender of claim 1 wherein the louvered openings lie in a plane substantially perpendicular to the axis of rotation of the tire.

10. The fender of claim 1 wherein the louvers extend outwardly from the side wall, the leading edges extending in a direction toward the front plate.

11. The fender of claim 1 wherein the tire when rotating creates a zone of turbulence about its surface and within the space defined by the front, back and top plates and the side wall and further comprising a rearward air scoop having a baffle spaced apart from the back plate and defining a flow passage therewith, the flow passage having its inlet in the zone of turbulence and its outlet beyond the zone of turbulence whereby spray and particulates controlled by the fender and striking the back plate are discharged downwardly and outside of the zone of turbulence.

12. The fender of claims 1 or 11 wherein
    the top plate includes at least one compression cover therein, the compression cover defining with the top plate a flow passage whereby the air flowing therethrough is compressed and then adiabatically discharged substantially rearwardly onto the rotating tire.

13. The fender of claim 12 wherein the compression cover extends upwardly from the top wall and includes depending sides which are joined to the top plate.

14. The fender of claim 13 wherein the flow passage is substantially rectangular in cross-section and diminishes in size from its inlet to its outlet.

15. The fender of claim 11 wherein an exit baffle is spaced apart form the under surface of the back plate and the back plate includes walls which are joined to the baffle.

16. The fender of claim 11 wherein the flow passage is substantially rectangular in cross-section.

* * * * *